United States Patent [19]
Blanc et al.

[11] 3,848,133
[45] Nov. 12, 1974

[54] ROLL FILM RADIOGRAPHIC CASSETTE

[75] Inventors: Marie Jean Blanc, Rueil, France; Emile Frans Stievenart, Hoboken, Belgium

[73] Assignee: AGFA-Gevaert N.V., Mortsel, Belgium

[22] Filed: Feb. 12, 1973

[21] Appl. No.: 331,373

Related U.S. Application Data

[63] Continuation of Ser. No. 138,997, April 30, 1971, abandoned.

[30] Foreign Application Priority Data

Apr. 1, 1970  Great Britain .................... 21146/70

[52] U.S. Cl. .............................. 250/469, 250/445
[51] Int. Cl. .......................................... G03b 17/26
[58] Field of Search ............................ 250/445, 469

[56] References Cited
UNITED STATES PATENTS

| | | | |
|---|---|---|---|
| 1,357,391 | 11/1920 | Freytag................................ | 250/469 |
| 2,026,000 | 12/1935 | Powers................................. | 250/469 |
| 2,321,156 | 6/1943 | Powers................................. | 250/469 |
| 2,468,381 | 4/1949 | Sussin.................................. | 250/469 |
| 3,365,575 | 1/1968 | Strax.................................... | 250/445 |
| 3,609,355 | 9/1971 | Schwarzer....................... | 250/445 X |

*Primary Examiner*—William F. Lindquist
*Attorney, Agent, or Firm*—William J. Daniel

[57] ABSTRACT

A radiographic film cassette for use in the production of mastographic images.

The cassette comprises an exposure frame and a holder for a roll of radiographic film. An intensifying screen is fitted in the exposure frame for contacting successive portions of a film at the side of the film which will be remote from the object at the exposure. The cassette may be arranged for manual transport of the film, and in that case it preferably contains means which facilitate to an operator to pull each time a constant length of film from the film roll in the holder.

5 Claims, 5 Drawing Figures

PATENTED NOV 12 1974  3,848,133

ROLL FILM RADIOGRAPHIC CASSETTE

This is a continuation, of Ser. No. 138,997, filed Apr. 30, 1971 now abandoned.

The present invention relates to a radiographic film cassette for use in the production of radiographic images on successive portions of a radiographic film web with the aid of an intensifying screen.

It is known to use, in the field of mastography, very contrasty radiographic film sheets which are emulsified on both sides and the back side of which, i.e., the side which is remote from the object, is in contact with an intensifying screen.

In the darkroom, a film is taken from a supply of films and inserted with an intensifying screen into a light-tight paper bag. The wrapped film is then laid on the platform of the radiographic exposing apparatus in daylight and the breast to be radiographed is pressed between the exposure cone of the radiographic tube and the film lying on the platform.

This method has the disadvantages that each exposure requires a film sheet to be taken from a supply and to be put into a light-tight bag in the darkroom, and that the sealing of the bag is not always carried out with sufficient care. In addition, the repeated use of the intensifying screen may damage it in an uncontrolled way.

It is an object of the invention to provide a cassette which enables the operator to make a number of radiographic images, e.g., mastographic images, in fairly quick succession, to facilitate preventive examination, particularly for breast cancer.

According to the present invention, a radiographic film cassette comprises means determining an exposure frame in which successive portions of a said film can be located for exposure to radiation penetrating into such frame, a holder for holding a roll of radiographic film, which holder has an opening via which such holder is in communication with said exposure frame and through which film can be drawn into said frame from said film roll, and at least one intensifying screen which is located in the exposure frame for contacting successive portions of a said film drawn into said frame for exposure.

The following are preferred embodiments of a radiographic film cassette according to the invention.

The holder is in light-tight communication with the exposure frame.

The cassette comprises a second film roll holder which is in light-tight connection with the film exit side of the exposure frame, for receiving the exposed film.

The cassette comprises only one intensifying screen, and said screen is located in the exposure frame at the side of the film which will be remote from the object at the exposure.

The intensifying screen is a fluorescent screen comprising from 110 to 140 g/m2 of calcium tungstate.

The exposure frame is made of a rigid material wherein an area is provided where the material is less rigid. Said area is formed by a rectangular opening in the exposure frame which is closed by a flexible light-tight foil.

In case the cassette comprises a second film roll holder, said holder may be provided with a core to which the leading end of the film is attached, and which may be rotated to pull successive portions of the film through the exposure frame. Such cassette may further comprise means for enabling the winding core to be rotated each time only over a limited number of revolutions, thereby to pull a constant length of film from the holder containing the unexposed film.

The invention includes apparatus for making radiographs, constructed to hold a cassette according to the invention as above defined and to be coupled through driving means to a film take-up spool for winding film through said cassette exposure frame from the film roll holder at the entry side of such frame. The driving means may operate to advance a film roll through said exposure frame in steps determined by perforations or other location marks in a said film, or it may operate on a mechanism which measures the length of film pulled from the unwinding spool.

The invention will now be described by way of example with reference to the accompanying drawing in which.

Figure 1:
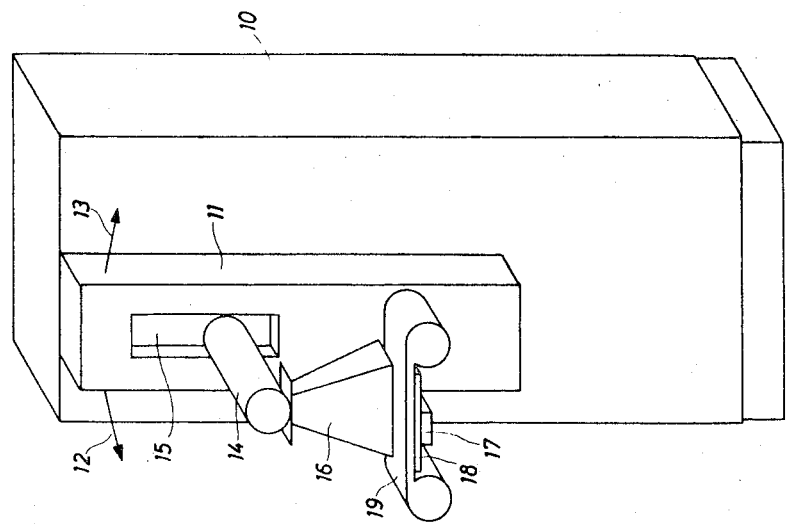
FIG. 1 is a perspective view of an apparatus for making radiographic images of the breast.

The apparatus according to FIG. 1 comprises a cabinet 10 wherein the electric supply and control means for the operation of the apparatus are provided. A column 11 is mounted on the cabinet for pivotation around a horizontal axis and may be pivoted in the directions indicated by the arrows 12 and 13 to take any angular position with respect to the cabinet. An X-ray tube 14 is slideably fitted to the column 11 and may be displaced through the opening 15 according to the length of the column.

The X-ray tube bears a cone 16 which limits the lateral spreading of the X-rays. The cone may have different lengths, and the lower opening thereof may have different forms and sizes adapted to fit different shapes and sizes of breasts. An horizontal arm 17 projects from the column 11 and a platform 18 is fitted for rotation in its own plane to the extremity of said arm.

A cassette 19 according to the invention is disposed with its exposure frame on the platform 18.

The apparatus according to FIG. 1 is operated as follows. The breast is pressed between the lower edge of the cone 16 and the upperside of the exposure frame of the cassette 19. The patient is allowed to stand upright or to lie down on her side so that radiographic images can be made according to the horizontal axis of the patient's body, as well as according to the lateral direction. The angular position of the column 11 and, occasionally the rotation of the platform 18, are adjusted in accordance with the area of the breast to be examined.

Figure 2:
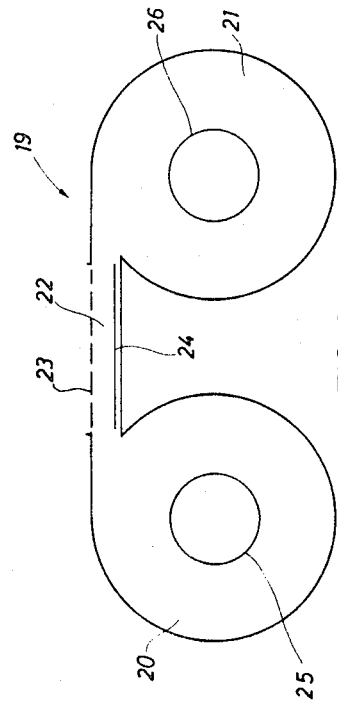
FIG. 2 is a diagrammatic longitudinal section of the cassette according to the invention.

A cassette according to the present invention is diagrammatically represented in FIG. 2. The cassette 19 comprises two cylindrical holders 20 and 21 which are connected to each other through an elongate part of rectangular cross-section which forms an exposure frame 22. The upper wall of the exposure frame 22 has a rectangular area 23 which is indicated diagrammatically in broken lines, and through which the exposure of the film occurs. Said area may be constituted by an area of the upper wall having a reduced thickness, but it may also be an opening in the upper wall of the frame which has been closed by a light-tight membrane. The lower wall of the exposure frame 22 is provided with a fluorescent intensifying screen 24 so that said screen will be in contact with the rearside of a film disposed in the exposure frame 22. A core 25 in the holder 20 contains a roll of unexposed radiographic film, the leading end of which is attached to a core 26 located in the holder 21 of the cassette. By interrupted rotation of the core 26 it is thus possible to stepwise pull the film through the cassette so that successive exposures may be made. In operation, the flexible portion 23 of the exposure frame 22 is pressed against the film by contact with the breast and the film is pressed against the fluorescent intensifying screen 24 so that a sharp image can be obtained. After exposure, the pressure is removed and the exposed part of the film is wound onto the core 26 by rotation of said core. The core 25 containing the roll of unexposed film may be braked by any conventional means.

Figure 3:
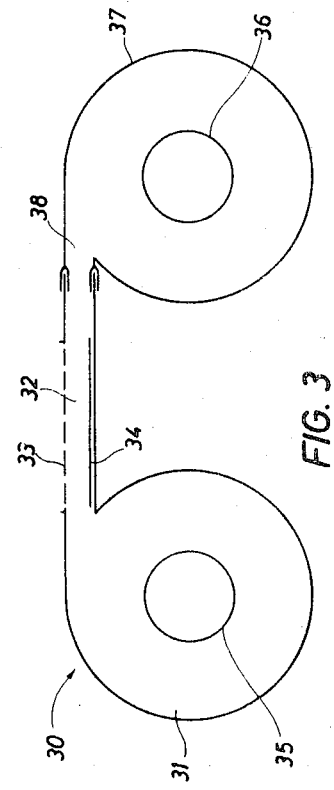
FIG. 3 is a diagrammatic longitudinal section of another embodiment of the cassette according to the invention.

FIG. 3 represents another embodiment of a cassette according to the present invention.

A cassette 30 comprises a cylindrical holder 31 which communicates with an exposure frame 32. The frame has an exposure area 33 and an intensifying screen 34 in a way similar to the cassette with reference to FIG. 2. The extremity of the frame 32 has a light-tight seal through which the leading portion of the film may be pulled from a roll 35 in order to be fixed to the take-up spool 36 in a cylindrical holder 37. This fixing may occur in that the holder 37 has a hinged lid which permits access to the spool, or the spool of said holder may be provided with self-gripping jaws or the like. This holder 37 has an inlet opening 38 which may fit light-tightly over the outlet opening of the cassette 30, so that after connection of both members 30 and 37, a film holder has been obtained, the operation of which corresponds to that of the cassette 19, described hereinbefore.

The film-receiving holder 37 may form an integral part of the exposure apparatus shown in FIG. 1 and co-operate therewith in driving relationship so that the apparatus may drive the core 36 for pulling successive lengths of film. However, the holder 37 may just be designed for co-operation with a cassette 30 to facilitate the removal and treatment of an exposed film roll. For instance, after the exposure of a roll of film, the holder 37 may be taken away from the cassette 30 and placed on a day-light processing apparatus. The trailing end of the film which extends through the light-sealed opening 38 may readily be inserted in said processing apparatus whereafter the opening 38 may be made to light-tightly fit to the processor.

The cassette 30 may be discarded, or it may be arranged for ready opening so that a fresh roll of film may be introduced therein in the darkroom.

Figure 4:
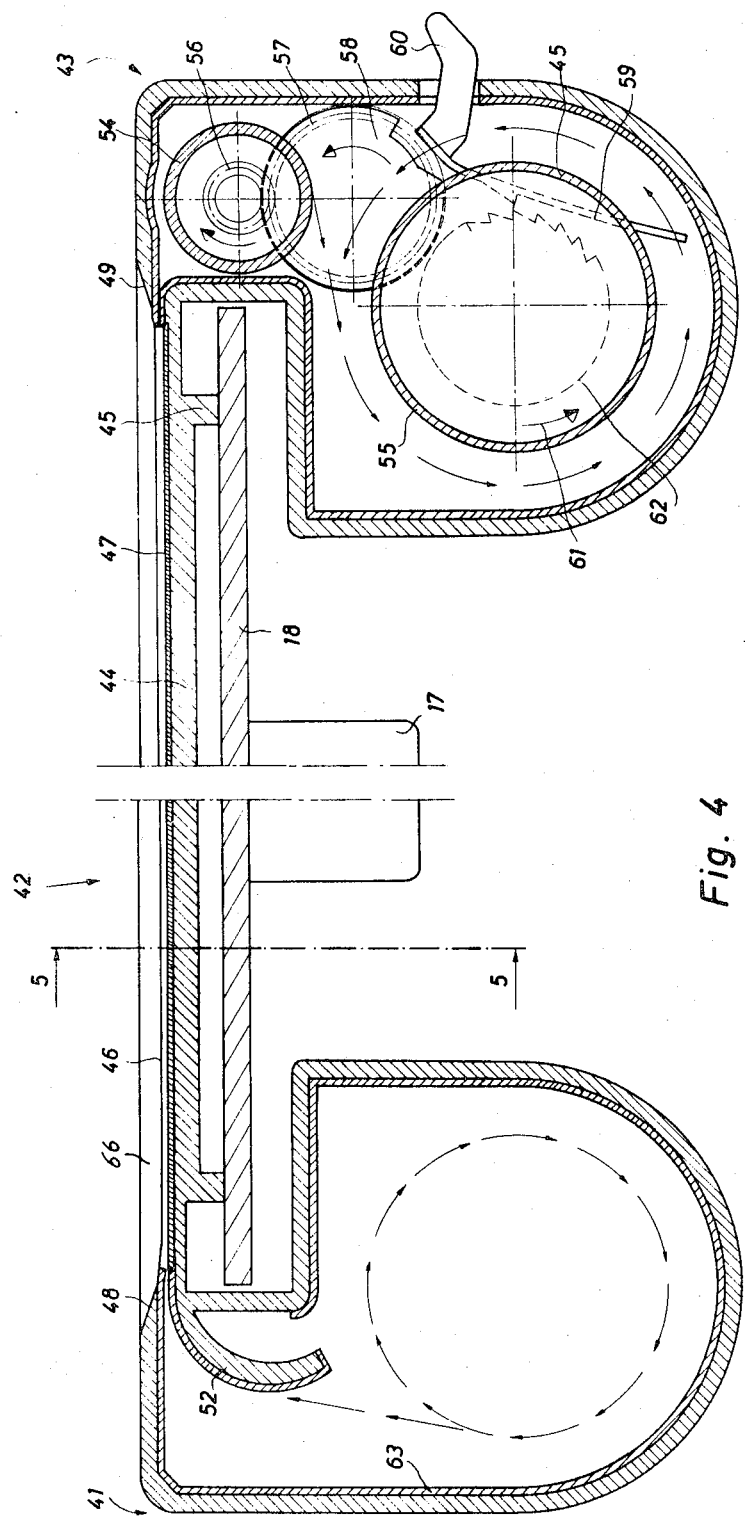
FIG. 4 is a detailed longitudinal section of an embodiment of a cassette according to the invention.
Figure 5:
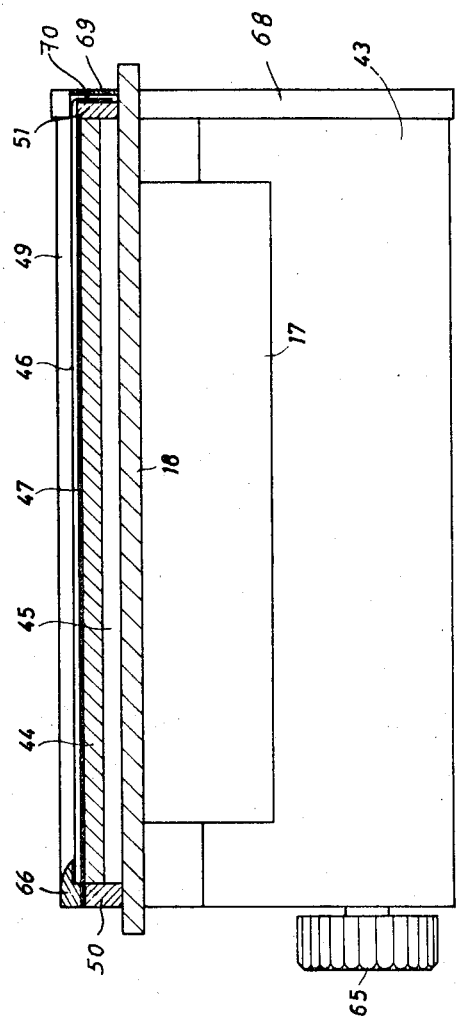
FIG. 5 is a section on line 5—5 of FIG. 4.

While the FIGS. 2 and 3 are diagrammatic illustrations only, illustrating the principles of a cassette according to the present invention, FIGS. 4 and 5 reveal more details about the actual construction of a cassette.

The cassette, which is drawn resting on the platform 18 of the exposure apparatus, comprises a semi-cylindrical holder 41, a rectangular exposure frame 42 and a semi-cylindrical holder 43, which parts form one integral unit.

The exposure frame has a rear wall 44 which is given sufficient rigidity by ribs, such as rib 45, and a front wall which is formed by a black pigmented plastic or rubber foil 46 which is light-tightly adhered at its transverse edges to the lower face of the upper wall of the cassette, adjacent to the transverse edges 48 and 49 of the exposure opening. At one longitudinal edge of the exposure opening, see FIG. 5, the foil 46 is adhered to the lower face of an elongate edge plate 66 which extends between the transverse edges 48 and 49 of the exposure opening and which is fitted to a sidewall 50 of the cassette, whereas at the other longitudinal edge, the foil is adhered with a flap 70, which is provided with an adhesive layer, to the outer face of the side wall 51 of the exposure frame which has a co-operating adhesive layer. In the mentioned way, the foil extremity may be readily removed from and adhered to said side wall 51. An intensifying screen 47 containing about 112 g/m2 of calcium tungstate is adhered to the rear wall 44.

The holder 41 of the cassette contains a roll of radiographic film which is wound into a roll without any core supporting the roll. The film (not shown) is pulled over a guide member 52, and passes between the intensifying screen 47 and the flexible foil 46 of the exposure frame 42 to the holder 43 of the cassette. In said holder 43, the film is pulled over a roller 54 which is free rotatably journalled therein and is covered with a resilient layer, and the film is received on a core 55 which is also rotatably supported and which may be rotated by means of a knob 65 which fitted to one extremity of the shaft of the core and which extends light-tightly at one side through the wall of the cassette.

The holders 41 and 43 and the exposure frame 42 are open at one side of the cassette. This side may be closed by means of a separate closing lid 68 which may light-tightly fit over the semi-cylindrical holders 41, 43 and the frame 42. The cross-section of said lid at the line 5—5 is indicated for the sake of clarity by numeral 69 in FIG. 5. The lid may be held on the cassette by any known means, such as snap fitting or the like.

The mechanism which controls the length of the advanced film is as follows. Roller 54 is provided at the innerside of the cassette with a pinion 56 which engages a gear 57. The gear 57 is fitted with a cam disk 58 which co-operates with a lever 59 in the form of a spring leaf which is provided with small grip 60 which extends light-tightly through the wall of the holder 43. The rotatable core 55 is provided with a ratchet and pawl or a like mechanism (not shown) which permits the core to be rotated only in the direction of the arrow 61. The core is further provided with a ratchet wheel 62 which co-operates with a pawl on the lever 59. The leading end of the roll of film in the holder 41 being attached to the core 55, the operation of the apparatus is as follows.

By actuating the grip 60, the operator pulls away the lever 59 so that the ratchet wheel 62 is set free. The operator may now revolve the core 55 by means of the knob 65 in the direction of the arrow 61 to remove the exposed length of film from the exposure film and to provide a successive length of film ready for exposure. During the movement of the film the roller 54 is rotated by frictional contact with the film and this rotation is transmitted at a slower rate to the cam disk 58. As the cam disk 58 has effected one turn, and since in the meantime the operator has released the grip 60, the lever 59 drops in the recessed portion of the cam disk 58, whereby its pawl arrests the ratchet wheel 62 and thereby also the rotation of the core. The diameter of the roller 54 and the gear ratio have been thus chosen that one rotation of the cam disk permits a film advance which corresponds to the length of the exposure frame.

If desired, counting means may be incorporated into the cassette for identification purposes, but it is also possible to identify the exposures in a conventional way by means of radiation absorbing symbols which are placed on the cassette.

After the exposure of the film the cassette is opened in the darkroom. The operator removes the lid 68 and takes out the core 55 containing the roll of exposed film which may be directly fitted to the inlet end of a processing apparatus.

In order to recharge the cassette with a roll of fresh film, the operator attaches the leading end of such a film roll to a core 55, pulls off the flap 70 from the wall 51 to make the exposure frame accessible, and then laterally introduces the film into the cassette. Thereafter, the operator tightens the foil 46 by pulling the flap portion 70, he adheres the flap 70 to the outer face of the wall 51, and finally he closes the cassette by means of the lid 68, whereafter the cassette is ready for use.

In the use of the cassette, it is important that no stray radiation of the source be captured by the film, whether exposed or not.

According to one embodiment, the cassette may be out of steel or the like with a thickness which allows a sufficient absorption of any possible stray radiation.

According to another embodiment, the cassette may be made of plastic or the like, for instance black pigmented high impact polystyrene, which is provided at the critical places with a radiation absorbent lining, e.g., lead, such as indicated by numeral 63 in FIG. 4. The innerside of the cassette may further be lined with a material such as felt, or the like, in order to protect the film from scratches, electrostatic charging, etc.

Finally, the take-up core 55 may also be arranged for automatic driving, and such driving may be performed by a small motor which may be incorporated into the cassette. Alternatively, the driving may occur by coupling with a driving shaft which forms part of the exposure apparatus and the operation of which is controlled by the exposure mechanism. Preferably the transmission from the driving shaft of the apparatus to the cassette occurs by a flexible shaft, or by a rigid shaft portion coupled through universal joints, to thereby maintain full freedom in the orientation of the platform 18 which supports the cassette.

The following parameters illustrate the cassette according to FIGS. 4 and 5.

Radiographic film roll: 7.2 m × 18 cm.
Intensifying screen: 112 g/m2 of calcium tungstate.
Useful opening of frame: 18 × 25 cm.
Number of exposures: 25.

We claim:

1. A radiographic film cassette for use in mastography by means of penetrating radiation comprising a first housing formed of radiation opaque material for holding a supply roll of radiographic film, a second housing formed of radiation opaque material for holding a roll of exposed film, a take-up roller rotatably mounted in said second housing for winding said roll of exposed film thereon, each such housing having an opening slit therein for the passage of the film, an interconnecting throat-like rigid frame of radiation opaque material extending between said housing and including two closely spaced side walls defining a narrow generally rectilinear film passageway communicating at its opposite ends with said housing openings, said throat-like frame having an opening in one side wall between said housings to define an exposure frame for a section of the film in said passageway and carrying on the other side wall facing said opening in intensifying screen at least the size of and aligned with said opening, a thin radiation permeable, actinic light impermeable film of generally stretchable material covering said opening, and adapted to yield under pressure to press the film against the screen, manually operable rotating means accessible exteriorly of said second housing for rotating said take-up roller to advance film from said supply roll through the passageway in said throat-like frame, and exteriorly releasable stop means effective to halt film movement after a predetermined distance including a friction roller within said second housing in frictional engagement with said film.

2. A radiographic film cassette according to claim 1 in which the intensifying screen has from 110 to 140 grams of calcium-tungstate per square meter.

3. The cassette of claim 1 wherein said exteriorly releasable stop means includes a detent on said friction roller, latch means in said second housing for engaging said detent after a predetermined extent of revolution of said friction roller and a manually operable release for said latch means accessible exteriorly of said second housing.

4. The cassette of claim 1 wherein said throat-like frame includes means for engaging the margins of said light-impermeable film to prevent the entry of light around the perimeter of the exposure frame opening.

5. The cassette of claim 1 including a light-proof detachable connection between said throat-like frame and at least one of said housings.

* * * * *

UNITED STATES PATENT OFFICE
CERTIFICATE OF CORRECTION

Patent No. 3,848,133          Dated November 12, 1974

Inventor(s) Marie Jean BLANC et al

It is certified that error appears in the above-identified patent and that said Letters Patent are hereby corrected as shown below:

In the Heading of the Patent

Correct the name of the assignee from "AGFA-Gevaert N.V."

to -- Agfa-Gevaert N.V. --.

In the Foreign Application Priority Data, change to

-- May 1, 1970 (Provisional) and April 22, 1971

(Complete)    Great Britain    21146/70 --.

Signed and sealed this 15th day of April 1975.

(SEAL)
Attest:

RUTH C. MASON
Attesting Officer

C. MARSHALL DANN
Commissioner of Patents
and Trademarks